US010933609B2

(12) United States Patent
Gupta et al.

(10) Patent No.: US 10,933,609 B2
(45) Date of Patent: Mar. 2, 2021

(54) COMPOSITE FOAM

(71) Applicant: The Regents of the University of California, Oakland, CA (US)

(72) Inventors: Vijay Gupta, Sherman Oaks, CA (US); Brian Jouse Ramirez, Commerce, CA (US); Utkarsh Misra, Cincinnati, OH (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/089,737

(22) PCT Filed: Mar. 31, 2017

(86) PCT No.: PCT/US2017/025591
§ 371 (c)(1),
(2) Date: Sep. 28, 2018

(87) PCT Pub. No.: WO2017/173396
PCT Pub. Date: Oct. 5, 2017

(65) Prior Publication Data
US 2019/0111658 A1    Apr. 18, 2019

Related U.S. Application Data

(60) Provisional application No. 62/316,241, filed on Mar. 31, 2016.

(51) Int. Cl.
*B32B 3/24* (2006.01)
*B32B 5/20* (2006.01)
(Continued)

(52) U.S. Cl.
CPC ............ *B32B 5/20* (2013.01); *B29C 44/1214* (2013.01); *B29C 44/1266* (2013.01);
(Continued)

(58) Field of Classification Search
None
See application file for complete search history.

(56) References Cited

U.S. PATENT DOCUMENTS 5,110,843 A   5/1992 Bries et al.
5,862,528 A   1/1999 Saijo et al.
(Continued)

FOREIGN PATENT DOCUMENTS

DE   102013224142 A1 * 5/2015 ........... A43B 17/006
WO   WO-2013025800 A2 * 2/2013 ......... C23C 18/1641
(Continued)

OTHER PUBLICATIONS

Boud Minerals, Expancel Microspheres, Wayback Date: Dec. 10, 2016, <https://www.boud.com/sites/default/files/u27/boud_minerals_-_introduction_to_expancel_thermoplastic_microspheres.pdf> (Year: 2016).*

(Continued)

*Primary Examiner* — Jeffrey A Vonch
(74) *Attorney, Agent, or Firm* — Gates & Cooper LLP

(57) ABSTRACT

Composite materials having superior material properties useful as impact absorbing devices can be fabricated by embedding a lattice structure (e.g., polymer lattice structure) within a foam, so that the foam reinforces the lattice structure under impact. Materials and dimensions of the foam and the lattice structure may be selected to achieve composite materials having tailored impact absorbing elastic and/or viscoelastic responses over a wide range of temperatures.

31 Claims, 10 Drawing Sheets

(51) Int. Cl.

| | |
|---|---|
| *B32B 27/40* | (2006.01) |
| *B29C 44/14* | (2006.01) |
| *B29C 70/68* | (2006.01) |
| *B29C 70/70* | (2006.01) |
| *B32B 5/18* | (2006.01) |
| *B29C 44/12* | (2006.01) |
| *B32B 3/26* | (2006.01) |
| *B32B 5/28* | (2006.01) |
| *B32B 5/32* | (2006.01) |
| *B29C 44/34* | (2006.01) |
| *B29C 41/20* | (2006.01) |
| *B29L 31/48* | (2006.01) |
| *B29K 675/00* | (2006.01) |
| *B29K 75/00* | (2006.01) |
| *B29K 105/04* | (2006.01) |
| *B29C 44/32* | (2006.01) |
| *A41D 13/05* | (2006.01) |
| *A42B 3/12* | (2006.01) |
| *A63B 71/10* | (2006.01) |
| *A63B 71/12* | (2006.01) |
| *B29L 31/00* | (2006.01) |
| *B32B 27/06* | (2006.01) |

(52) U.S. Cl.
CPC ........ *B29C 44/1276* (2013.01); *B29C 70/682* (2013.01); *B29C 70/688* (2013.01); *B29C 70/70* (2013.01); *B32B 3/266* (2013.01); *B32B 5/18* (2013.01); *B32B 27/40* (2013.01); *A41D 13/0518* (2013.01); *A41D 13/0543* (2013.01); *A41D 2500/50* (2013.01); *A41D 2600/10* (2013.01); *A42B 3/125* (2013.01); *A63B 71/10* (2013.01); *A63B 71/1225* (2013.01); *A63B 2071/1208* (2013.01); *A63B 2071/1258* (2013.01); *B29C 41/20* (2013.01); *B29C 44/332* (2016.11); *B29C 44/3403* (2013.01); *B29C 44/348* (2013.01); *B29C 44/3415* (2013.01); *B29C 44/355* (2013.01); *B29K 2075/00* (2013.01); *B29K 2075/02* (2013.01); *B29K 2105/041* (2013.01); *B29K 2105/045* (2013.01); *B29K 2105/046* (2013.01); *B29K 2675/00* (2013.01); *B29K 2675/02* (2013.01); *B29K 2715/003* (2013.01); *B29K 2995/0046* (2013.01); *B29K 2995/0063* (2013.01); *B29K 2995/0091* (2013.01); *B29L 2031/4821* (2013.01); *B29L 2031/4842* (2013.01); *B29L 2031/768* (2013.01); *B32B 5/28* (2013.01); *B32B 5/32* (2013.01); *B32B 27/065* (2013.01); *B32B 2260/00* (2013.01); *B32B 2260/046* (2013.01); *B32B 2266/0278* (2013.01); *B32B 2266/06* (2013.01); *B32B 2266/08* (2013.01); *B32B 2266/10* (2016.11); *B32B 2266/104* (2016.11); *B32B 2305/02* (2013.01); *B32B 2305/022* (2013.01); *B32B 2305/07* (2013.01); *B32B 2305/38* (2013.01); *B32B 2307/51* (2013.01); *B32B 2307/56* (2013.01); *B32B 2307/72* (2013.01); *B32B 2375/00* (2013.01); *B32B 2437/00* (2013.01); *B32B 2437/04* (2013.01); *B32B 2571/02* (2013.01); *Y10T 428/24322* (2015.01); *Y10T 428/249953* (2015.04); *Y10T 428/249975* (2015.04); *Y10T 428/249978* (2015.04); *Y10T 428/249987* (2015.04); *Y10T 428/249988* (2015.04); *Y10T 428/249991* (2015.04)

(56) References Cited

U.S. PATENT DOCUMENTS

| | | | | |
|---|---|---|---|---|
| 6,020,392 A * | 2/2000 | Kushner | ............... | C08G 18/10 521/130 |
| 6,037,383 A * | 3/2000 | Krech | .................. | C08G 18/089 521/155 |
| 6,046,249 A * | 4/2000 | Tobias | ................ | C08G 18/341 521/138 |
| 6,239,186 B1 * | 5/2001 | Mansfield | ............. | C08J 9/0061 521/112 |
| 6,387,972 B1 * | 5/2002 | Ghobary | ............. | C08G 18/089 521/115 |
| 8,320,727 B1 * | 11/2012 | Jacobsen | ............... | F28D 20/023 385/129 |
| 8,353,240 B1 * | 1/2013 | Schaedler | ............ | F41H 5/0492 89/36.02 |
| 9,116,428 B1 * | 8/2015 | Jacobsen | .................. | G03F 7/09 |
| 9,341,775 B1 * | 5/2016 | Eckel | .................... | G02B 6/138 |
| 9,415,562 B1 * | 8/2016 | Schaedler | ............ | B81C 1/00126 |
| 2004/0012118 A1 | 1/2004 | Perez et al. | | |
| 2004/0229968 A1 * | 11/2004 | Dontula | ................. | C08J 9/0061 521/79 |
| 2004/0254256 A1 * | 12/2004 | Lockwood | ......... | C08G 18/1833 521/174 |
| 2008/0009556 A1 | 1/2008 | Schneider et al. | | |
| 2008/0076843 A1 * | 3/2008 | Clark | ................. | C08G 18/3893 521/137 |
| 2010/0323181 A1 * | 12/2010 | Nutt | ..................... | B29C 70/205 428/221 |
| 2011/0107904 A1 * | 5/2011 | Queheillalt | .......... | F41H 5/0457 89/36.02 |
| 2011/0117315 A1 * | 5/2011 | Kang | .................... | B21F 27/128 428/112 |
| 2011/0256346 A1 * | 10/2011 | Bowden | ............... | A41D 31/285 428/138 |
| 2011/0283873 A1 * | 11/2011 | Wadley | .................. | B32B 5/02 89/36.02 |
| 2012/0036698 A1 * | 2/2012 | Guertin | ............... | A63B 63/004 29/428 |
| 2012/0151868 A1 * | 6/2012 | Kang | .................... | B21F 27/128 52/649.1 |
| 2012/0196946 A1 * | 8/2012 | Macken | ................. | C08G 18/10 521/159 |
| 2013/0035413 A1 * | 2/2013 | Obi | ...................... | C08G 18/4837 521/176 |
| 2013/0312287 A1 * | 11/2013 | Gupta | ...................... | A43B 7/32 36/102 |
| 2014/0252674 A1 * | 9/2014 | Hundley | .................. | B32B 7/02 264/221 |
| 2014/0259787 A1 * | 9/2014 | Guyan | .................. | A43B 13/12 36/103 |
| 2014/0272277 A1 * | 9/2014 | Schaedler | ................ | B32B 7/02 428/116 |
| 2015/0197617 A1 * | 7/2015 | Prissok | .................. | C08G 18/10 521/137 |
| 2015/0223547 A1 * | 8/2015 | Wibby | .................. | A42B 3/064 2/414 |
| 2015/0306861 A1 * | 10/2015 | Mankame | ............... | B32B 37/02 156/275.5 |
| 2015/0328512 A1 * | 11/2015 | Davis | .................... | A63B 60/08 473/563 |
| 2015/0351493 A1 * | 12/2015 | Ashcroft | ............... | A61B 5/6807 36/132 |
| 2016/0136889 A1 * | 5/2016 | Rolland | ................ | C09D 135/02 264/1.27 |
| 2016/0145961 A1 * | 5/2016 | Yu | ........................ | E21B 33/1208 166/179 |
| 2016/0150835 A1 * | 6/2016 | Salmini | ................ | A63B 71/1225 428/134 |
| 2016/0374428 A1 * | 12/2016 | Kormann | ............... | A43B 13/186 36/28 |
| 2017/0127748 A1 * | 5/2017 | Sethumadhavan | ....... | B32B 5/32 |
| 2017/0307040 A1 * | 10/2017 | Schaedler | ................ | F16F 7/00 |

(56) References Cited

U.S. PATENT DOCUMENTS

| | | | | |
|---|---|---|---|---|
| 2017/0360156 | A1* | 12/2017 | Lussier | B29C 35/0805 |
| 2018/0027914 | A1* | 2/2018 | Cook | A42B 3/12 |
| 2019/0290982 | A1* | 9/2019 | Davis | A63B 60/08 |

FOREIGN PATENT DOCUMENTS

| | | |
|---|---|---|
| WO | 2014137924 | 9/2014 |
| WO | 2015016158 | 2/2015 |

OTHER PUBLICATIONS

Ostos et al., Deformation stabilization of lattice structures via foam addition, Nov. 2012, Acta Materialia, vol. 60, Issue 19,pp. 6476-6485 (Year: 2012).*

Hammetter et al., Compressive Response of Pyramidal Lattices Embedded in Foams, Jan. 2014, Journal of Applied Mechanics, vol. 81, pp. 011006 (Year: 2014).*

Moreland et al., Viscoelastic behavior of flexible slabstock polyurethane foams: Dependence on temperature and relative humidity. I . Tensile and compression stress (load) relaxation, Apr. 1994, Journal of Applied Polymer Science (Year: 1994).*

White, Viscoelastic foam mattresses: marketing hype or molecular miracle?, Dec. 2001, Urethanes Technology, vol. 18, No. 6 (Year: 2001).*

Mills et al., Polymer foams for personal protection: cushions, shoes and helmets, Dec. 2003, Composites Science and Technology, vol. 63, Issue 16 (Year: 2003).*

Sorrentino et al., A simple method to predict high strain rates mechanical behavior of low interconnected cell foams, Oct. 2007, Polymer Testing, vol. 26, Issue 7 (Year: 2007).*

Lee et al., Shape memory effects of molded flexible polyurethane foam, Oct. 2007, Smart Materials and Structures, vol. 16, No. 6 (Year: 2007).*

Campbell et al., Periodic Cellular Metal/Polyurethane Foam Hybrid Materials, Dec. 2008, Journal of Composite Materials (Year: 2008).* de Vries, Characterization of polymeric foams, Jul. 2009 (Year: 2009).*

Campbell, Metal and Polymer Foam Hybrid Materials: Design, Fabrication and Analysis, Dec. 2010 (Year: 2010).*

Shivakumar et al., An Experimental Study on Mechanical Behavior and Microstructures of Polyurethane Foams for Design Applications, 2011, International Journal of Aerospace Innovations, vol. 3, Issue 3 (Year: 2011).*

Petel et al., The elastic—plastic behaviour of foam under shock loading, Oct. 2012, Shock Waves, vol. 23, Issue 1 (Year: 2012).*

Wu et al., Theoretical and experimental study of foam-filled lattice composite panels under quasi-static compression loading, Apr. 2014, Composites Part B: Engineering, vol. 60 (Year: 2014).*

Yan et al., Quasi-static and dynamic mechanical responses of hybrid laminated composites based on high-density flexible polyurethane foam, Dec. 2015, Composites Part B: Engineering, vol. 83 (Year: 2015).*

Lou et al., Manufacturing and mechanical characterization of perforated hybrid composites based on flexible polyurethane foam, Apr. 2015, Journal of Applied Polymer Science (Year: 2015).*

Gwon et al., Modulation of cavities and interconnecting pores in manufacturing water blown flexible poly (urethane urea) foams, Oct. 2015, International Journal of Precision Engineering and Manufacturing, vol. 16 (Year: 2015).*

Tammaro et al., Validated modeling of bubble growth, impingement and retraction to predict cell-opening in thermoplastic foaming, Mar. 2016, Chemical Engineering Journal, vol. 287, Issue 1 (Year: 2016).*

Ramirez et al., Tailoring the rate-sensitivity of low density polyurea foams through cell wall aperture size, Jun. 2017, Journal of Applied Physics, vol. 121 (Year: 2017).*

Tang et al., Dependences of Rheological and Compression Mechanical Properties on Cellular Structures for Impact-Protective Materials, May 2017, ACS Omega, vol. 2, Issue 5 (Year: 2017).*

Ramirez et al., Viscoelastic foam-filled lattice for high energy absorption, Dec. 2018, Mechanics of Materials, vol. 127 (Year: 2018).*

Reed et al., Synthesis and characterization of elastomeric polyurea foam, Dec. 2019, Journal of Applied Polymer Science (Year: 2019).*

PCT International Search Report & Written Opinion dated Jun. 21, 2017 for PCT Application No. PCT/US17/25591.

* cited by examiner

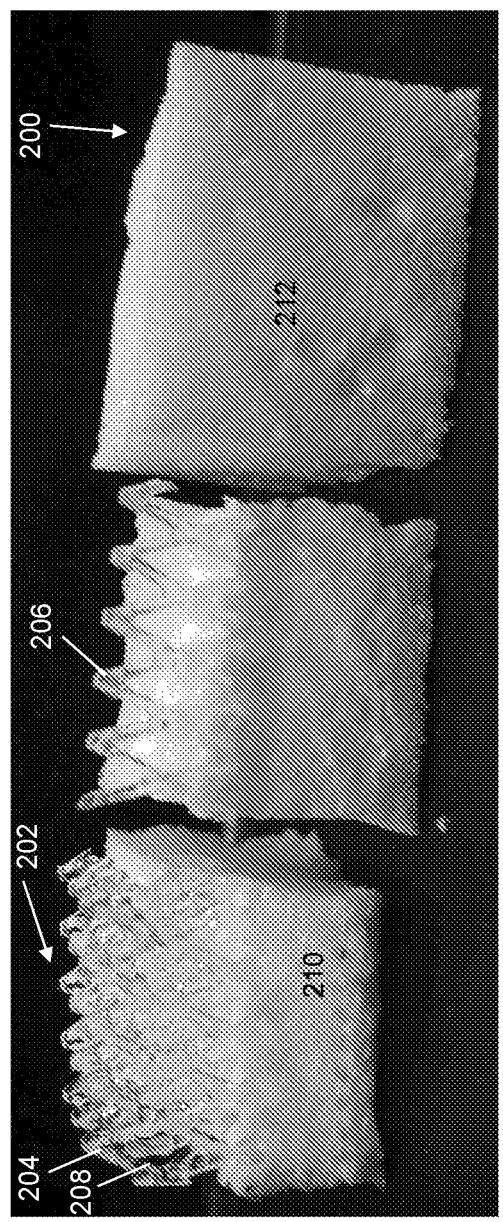

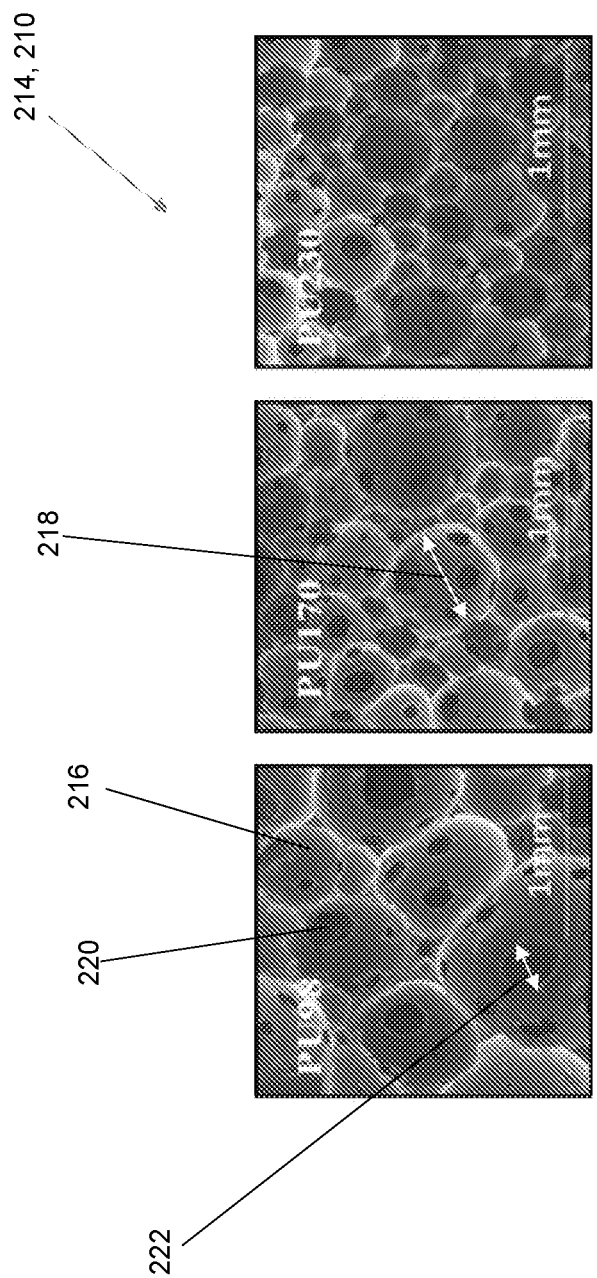

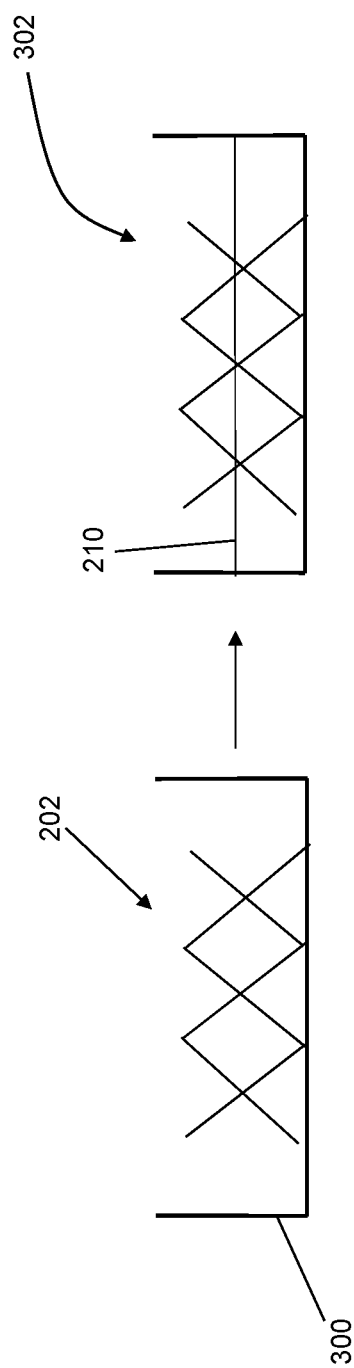

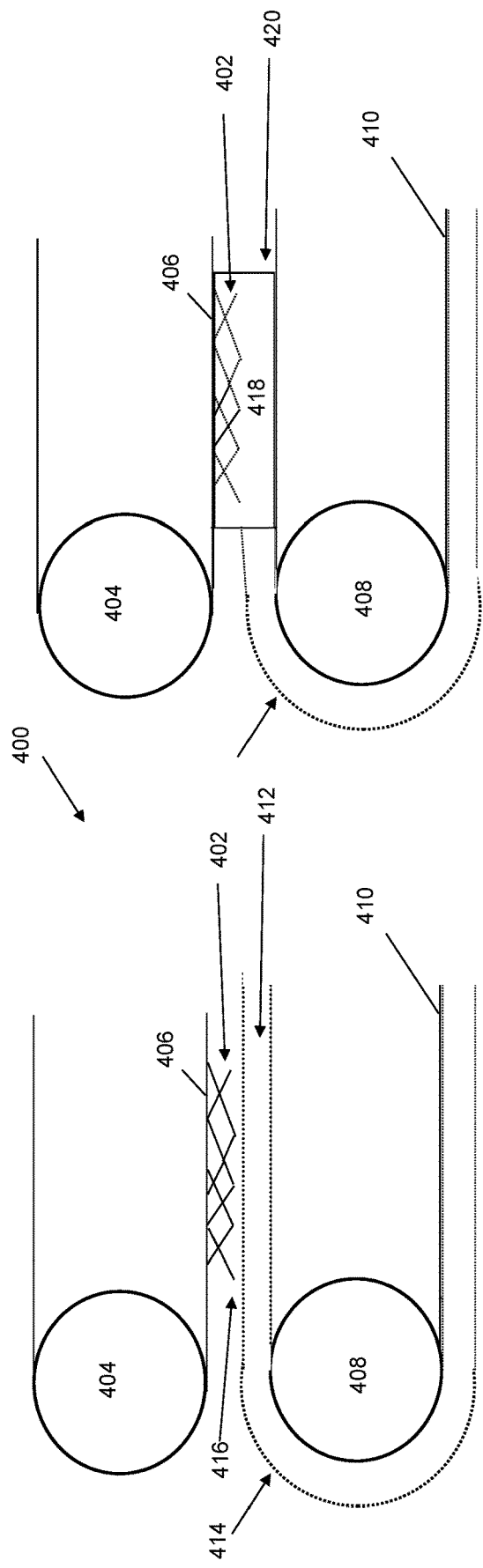

COMPOSITE FOAM

CROSS REFERENCE TO RELATED APPLICATIONS

This application claims the benefit under 35 U.S.C. Section 119(e) of U.S. Provisional Patent Application Ser. No. 62/316,241, entitled "COMPOSITE FOAM" filed Mar. 31, 2016, the contents of which are incorporated herein by reference.

TECHNICAL FIELD

The invention relates to impact absorbing composite materials and methods of forming such composite materials.

BACKGROUND OF THE INVENTION

The impact absorbance of a material relates to its ability to absorb an impact energy or force that is applied to it over a short time period. Such a force or shock typically has a greater effect than a lesser force applied over a proportionally longer period of time. In addition to the relative velocity of the colliding materials, the impact absorbance of a material also varies with the temperature and other environmental conditions. For example, some materials may become stiffer and more brittle at lower temperatures, resulting in lower impact absorbance when compared to the same material at higher temperatures.

Most polymeric materials in the art strain-harden upon impact, causing the skeleton struts and beams to stiffen up. This is followed by simultaneous collapse of pores that are typically of the same size. The overall result is that a large stress builds up instantaneously, followed by foam bottoming and a sudden drop in the stress with minimal energy absorption and momentum trapping. Moreover, the use of phase transformation as a major energy dissipation mechanism (due to a very high glass-transition temperature) has been shown to be efficient only under ambient conditions.

Thus, there is a need for a material that has improved impact absorbance. Preferably, such a material has relatively similar impact absorbance characteristics under a wide range of cold and hot temperature conditions. Furthermore, it is desirable for such a material to be able to absorb repeated impacts or multiple hits.

SUMMARY OF THE INVENTION

As disclosed herein, composite materials having superior material properties useful as impact absorbing devices can be fabricated by embedding a lattice structure (e.g., polymer lattice structure) within a foam, so that the foam reinforces the lattice structure under impact.

To better illustrate the composite materials and methods disclosed herein, a non-limiting list of examples is provided here:

In Example 1, the lattice structure comprises struts having a length and/or width in a range from 1 micrometer to 100 centimeters and the foam comprises pores having a width in a range of 1-1000 micrometers.

In Example 2, the subject matter of Example 1 optionally includes the foam comprising dimensions and/or materials that reinforce the lattice structure against elastic buckling under dynamic compression; and the struts comprising material, dimensions, geometry, and spacing such that the lattice structure elastically dissipates energy of an impact while force from the impact is still building up in the composite material.

In Example 3, the subject matter of one or both of Examples 1 and 2 optionally includes the lattice struts comprising material, dimensions, geometry, and spacing, and/or the foam comprising material, pore size, and pore spacing such that an impact that generates an elastic response in the composite material generates a stress of no more than 5 MPa in the composite material.

In Example 4, the subject matter of one or any combination of Examples 1-3 includes the struts comprising material, dimensions, geometry, and spacing, and/or the foam comprising material, pore size, and pore spacing such that a peak force of no more than 2.16 kN and/or a stress of 0.1 MPa to 5 MPa is generated in the composite material in response to a 5.5 kg weight having an energy of 15 Joules impacting a 45 mm by 45 mm area on the composite material.

In Example 5, the subject matter of one or any combination of Examples 1-4 includes the struts comprising material, dimensions geometry, and spacing, and/or the foam comprising material, pore size, and pore spacing, such that two or more equivalent and repeated impacts on the composite material generate maximum forces in the composite material that have a variability of less than 0.7 kN from each other.

In Example 6, the subject matter of one or any combination of Examples 1-5 includes the struts comprising a polymer having a glass transition temperature such that impacts on the composite material under temperatures ranging from −17° C. to 50° C. generate maximum forces in composite material within 3 kN of each other.

In Example 7, the subject matter of one or any combination of Examples 1-6 includes the struts comprising material, dimensions, geometry, and spacing, and/or the foam comprising material, pore size, and pore spacing, such that the composite material absorbs more impact energy per unit area and thickness than a PORON™20 foam.

In Example 8, the subject matter of one or any combination of Examples 1-7 includes the foam comprising a blend between a polymeric di-isocyanate and a polyol or an amine.

In Example 9, the subject matter of one or any combination of Examples 1-8 includes the foam comprising a polyurethane foam, polyuria foam, ceramic foam, expanded polystyrene (EPS) foam, expanded polypropylene (EPP) foam, or D3O™.

In Example 10, the subject matter of one or any combination of Examples 1-8 includes the foam having a density in a range between 50 kg/m$^3$ and 800 kg/m$^3$.

In Example 11, the subject matter of one or any combination of Examples 1-10 includes the composite material being an elastic or viscoelastic material.

In Example 12, the subject matter of one or any combination of Examples 1-11 includes the composite material comprising a bilayer including a layer of the foam infused with the polymer lattice structure and a layer of the foam that is not infused with the lattice structure.

In Example 13, the subject matter of one or any combination of Examples 1-12 includes a protective covering or armor (e.g., helmet, shin guard, or vest) comprising the composite material. Applications include, but are not limited to, using the polyurea foam or the composite comprising the polyurea foam for head and body protection as well as protection in consumer products, such as, but not limited to, cell phones, mobile devices, etc.

In Example 14, a method of fabricating the subject matter of one or any combination of Examples 1-13 includes preparing the lattice structure comprising a polymer; and foaming a mixture through the lattice structure so as to form the foam and the lattice structure embedded in the foam.

In Example 15, the method of Example 14 optionally further includes placing the lattice structure in the mixture prior to the foaming.

In Example 16, the method of Example 14 optionally further comprises positioning the lattice structure in a mold; and pouring the mixture into the mold, wherein the foaming results in the mixture rising up in the mold and infusing with the lattice structure.

In Example 17, the method of Example 14 optionally further comprises continuously feeding the lattice structure through a top roller; and continuously feeding the mixture on a surface carried by a bottom roller, the mixture positioned below the lattice structure; and wherein the mixture foam rises up and infuses with the lattice structure, thereby creating a sheet of the composite material.

In Example 18, the subject matter of one or any combination of Examples 14-17 includes carrying out the foaming at one or more temperatures ranging from 50° C. to 400° C.

In Example 19, the subject matter of one or any combination of Examples 14-18 includes curing the composite material at a temperature ranging from 70° C. to 300° C.

In Example 20, the subject matter of one or any combination of Examples 14-19 comprises applying a negative pressure to the mixture during the foaming.

In Example 21, the present disclosure further describes a polyurea foam (e.g., useful as an impact absorbing material by itself or in combination with the composite described herein in any of the Examples 1-21), wherein the polyurea foam comprises an oligomeric diamine polyol combined with diisocyanate.

In Example 22, the diamine polyol of Example 21 is versalink P1000 and the diisocyanate of Example 21 is Isonate 143L.

In Example 23, the subject matter of one or any combination of Examples 21-22 includes a ratio of diamine polyol to diisocyanate ranging from 1:1 to 10:1.

In Example 24, the subject matter of one or any combination of Examples 21-23 includes a ratio (of diamine polyol (e.g., versalink P1000) to diisocyanate (e.g., Isonate 143L) is 4:1.

In Example 25, the subject matter of one or any combination of Examples 21-24 includes the polyurea foam having a density in a range of 30 kg/m3 to 500 kg/m$^3$.

In Example 26, the subject matter of one or any combination of Examples 21-24 includes the polyurea foam comprising cells, wherein the cells include perforations or apertures, and the cells have a cell size and the apertures or perforations have an aperture size independently controlled from each other. In one or more examples, the cell sizes range from 1 micron to 1000 microns and the aperture sizes range from 1 micron-1000 microns. The cell size and aperture size may be controlled independently of another by appropriate selection of formulation and additives. A same density of the foam can be achieved using different cell sizes and aperture sizes. For example, a polyurea foam of density 280 kg/m$^3$ can have cell size of about 450 microns, and an aperture size of 66 microns. However, a foam of same density and cell size can also be fabricated using an aperture size of only 20 microns.

In Example 27, the subject matter of one or any combination of Examples 21-26 includes the foam having a temperature stability characterized by a glass transition temperature (Tg) controllable in a range from Tg (−50° C.) up to at least room temperature.

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

Referring now to the drawings in which like reference numbers represent corresponding parts throughout:

FIGS. 2A-2C illustrate a composite material and the foaming process in a lattice structure, in accordance with one or more embodiments of the invention, showing lattice structures in various stages of being embedded in a foam, with the lattice structure being fully embedded in the foam in FIG. 2C;

FIG. 2D-2F illustrates a polyurea foam fabricated according to one or more embodiments of the invention, wherein the foam in FIG. 2D has a density of 98 kg/m$^3$, the foam in FIG. 2E has a density of 170 kg/m$^3$, and the foam in FIG. 2D has a density of 230 kg/m$^3$.

FIGS. 3A-3B illustrate a foaming process using a mold, according to one or more embodiments of the invention;

FIGS. 4A-4B illustrate a foaming process using sheet casting, according to one or more embodiments of the invention;

DETAILED DESCRIPTION OF THE INVENTION

Figure 1:
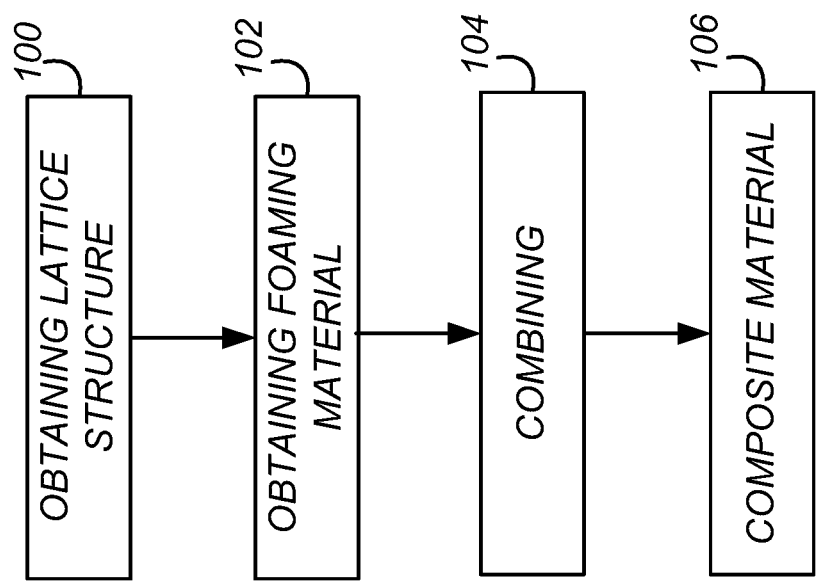
FIG. 1 is a flowchart illustrating a method of fabricating the composite foam according to one or more embodiments of the invention.

Many of the techniques and procedures described or referenced herein are well understood and commonly employed using conventional methodology by those skilled in the art. In the description of the preferred embodiment, reference may be made to the accompanying drawings which form a part hereof, and in which is shown by way of illustration a specific embodiment in which the invention may be practiced. It is to be understood that other embodiments may be utilized and structural changes may be made without departing from the scope of the present invention.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

The present disclosure discloses a composite material comprising a lattice structure embedded within a foam matrix, e.g., so that the foam matrix reinforces lattice structure and the lattice structure supports the foam matrix. As shown by the data presented herein, the combination of these materials as disclosed herein generates a synergistically strong composite material having surprising and desirable material properties.

Process Steps

FIG. 1, FIG. 2A-2C, FIG. 3A-3B, and FIG. 4A-4B illustrate methods of forming a composite material comprising a lattice structure embedded in a foam.

Block 100 represents preparing or obtaining a preformed lattice structure 202 made from, e.g., organic or inorganic materials 204.

In one or more embodiments, the lattice structure 202 comprises any three-dimensional geometric structure (e.g., triangular structure) including struts 206, beams, or columns that form open lattice spaces 208. Lattice structure examples include, but are not limited to, micron to centimeter size (length and width) struts that are arranged in a truss or in truss-like geometries. Examples of materials used to fabricate the lattice structure include, but are not limited to, at least one material selected from a polymer, carbon fiber, and a glass fiber so that the lattice structure comprises or consists essentially of a polymer, glass fiber, and/or carbon fiber lattice structure.

Examples of dimensions include, but are not limited to, the struts having a length and width in a range from 1 micrometer to 100 centimeters. In one embodiment, the lattice structure is a microlattice comprising struts having a length and width in a range of 1 micrometer to 900 micrometers.

Block 102 represents preparing or obtaining a foaming material 210. Examples of foaming materials include materials that form traditional commercial foam (polyurethanes, D30, polyurea, ceramic foams, EPS and EPP foams, etc.). In one or more embodiments, the foaming material comprises a combination of multiple components (e.g., formed by mixing, e.g., to form a liquid mixture). FIG. 2 illustrates multi-component foaming material 210 comprising a two-component blend between a polymeric di-isocyanate and a polyol or an amine, with additional catalysts and additives present (e.g. blowing agents, chain extenders, surfactants, blowing and gelling catalysts). Such chemicals result in polyurethane foams and polyurea foams of wide ranging densities.

In one or more embodiments, the polyurea foam component itself comprises any oligomeric diamine polyol combined with diisocyanate (e.g., modified Methylene Diphenyl Diisocyanate (MDI)). In one example, versalink P1000 is combined with Isonate 143L, e.g., using a 4:1 ratio of Versalink P1000 to Isonate 143L, however any ratio ranging from 1:1 to 10:1 may be used. Moreover, the components of the polyurea foam are not restricted to particular brand names, and other brands other than versalink and isonoate may be used.

FIGS. 2D-2F illustrates a polyurea foam 214 comprising a cell 216 having a cell size 218 and apertures/perforations 220 on the cell having a perforation size 222.

The polyurea foam itself may form a foam having a range of designed densities. Examples of densities of the polyurea foam including, but are not limited to, densities in a range from 30 kg/m$^3$ to 500 kg/m$^3$. The polyurea foam cell size (e.g., diameter) can be controlled independently from the aperture/perforation size (e.g., diameter) and vice versa (i.e., the aperture/perforation size can also be controlled independently from the cell size).

For example, a polyurea foam of density 280 kg/m$^3$ can have cell size of about 450 microns, and an aperture size of 66 microns. However, a foam of same density and cell size can also be fabricated using an aperture size of only 20 microns. The same density can be achieved with various cell sizes and aperture sizes.

Examples of cell sizes include, but are not limited to, cell sizes in a range from 1 micron to 1000 microns. Examples of aperture sizes include, but are not limited to, aperture sizes in a range from 1 micron-1000 microns.

The polyurea foam temperature stability can be obtained from using the foam having a low glass transition temperature Tg (−50 C). The Tg of the foam can be controlled to suit the application of interest thus the Tg may be changed to be below or above (−50 C) through selecting formulation (composition of the polyurea) and selecting the additives.

While the lattice material of the composite can be made of any polymer material and other materials, it can be made of polyurea as described herein.

Block 104 represents combining the foaming material 210 and the lattice structure 202, wherein the foaming material 210 forms a foam 212 and the lattice structure 202 is embedded in the foam 212.

Typically, the combining comprises foaming or initiating a foaming process so that the foaming material foams through the open lattice spaces in the lattice structure. The combining proceeds so that the lattice structure is completely or partially embedded in the foam. In one embodiment, the foam is infused only part-way through the lattice structure from one side. In yet another embodiment the foam is infused partway from both sides into the lattice structure, leaving the central section of the lattice structure free of any foam. In another embodiment, the composite foam material further comprises a layer of pure foam to create a bilayer structure of pure foam and composite foam.

A variety of methods may be used for infusing or combining the foam into/with the lattice structure.

FIGS. 2A-2C illustrates the foaming material comprising a liquid mixture (in this instance, polymeric di-isocyanate and a polyol or an amine components with appropriate catalysts and additives) poured into a mold. Next, the lattice structure 202 is (e.g., quickly) placed into the foaming material 210. Subsequently, a foaming process takes place, allowing the liquid mixture to cream and rise through the lattice structure 202. In this case, the preformed lattice structure is completely embedded in the foam.

FIG. 3A and FIG. 3B illustrate an embodiment wherein the lattice 202 is first fixed into a mold 300 (FIG. 3A). The foaming material 210 is then poured 302 at the bottom of the mold 300 (FIG. 3B). The foam rises up as the foaming process initiates and infuses through the lattice structure, forming the composite foam at the end of the foaming process.

FIG. 4A and FIG. 4B illustrate an embodiment wherein the composite foam material is made using a sheet casting process using an apparatus 400 wherein the lattice material 402 is fed through a top roller 404 on a top sheet 406 while a lower roller 408 carries a lower sheet 410 (e.g., paper) on which the foaming material 412 is spread in a continuous manner. The lower sheet 410 plus the thickness of the foaming material 412 are such that the top surface 414 of the foaming material 412 is in close vicinity to the bottom surface 416 of the lattice material 402 fed through the top roller 404. As the foaming process (FIG. 4B) proceeds on the lower sheet 410, the foaming 418 rises through the lattice 402 that is directly above it. The continuous feeding of the foaming material 418 on the lower sheet 410 and of the lattice 402 through the top roller 404 results in a continuous sheet of composite foam material 420, as illustrated in FIG. 4B.

Depending upon the type of foaming material used, the fabrication processes described above are carried out at a given temperature (e.g., 50° C. to 400° C.) or under ambient conditions. In certain instances, the method includes curing at 70° C. to 300° C. after the composite foam material has been formed.

In some embodiments, a negative pressure or (e.g., small) vacuum (14 psi or any other level as needed for specific viscosity of the mix) is used to assist in the infiltration of the foaming gel/material into the lattice preform. This can be used for both the box mold (FIG. 3A-3B) and the sheet casting (FIG. 4A-4B) processes described above.

Block 106 represents the end result, a composite material 200, 420 comprising a lattice structure 202, 402 embedded in a foam 212, 418 e.g., wherein the foam 212, 418 reinforces the lattice structure 202, 402 under impact.

Figure 6:
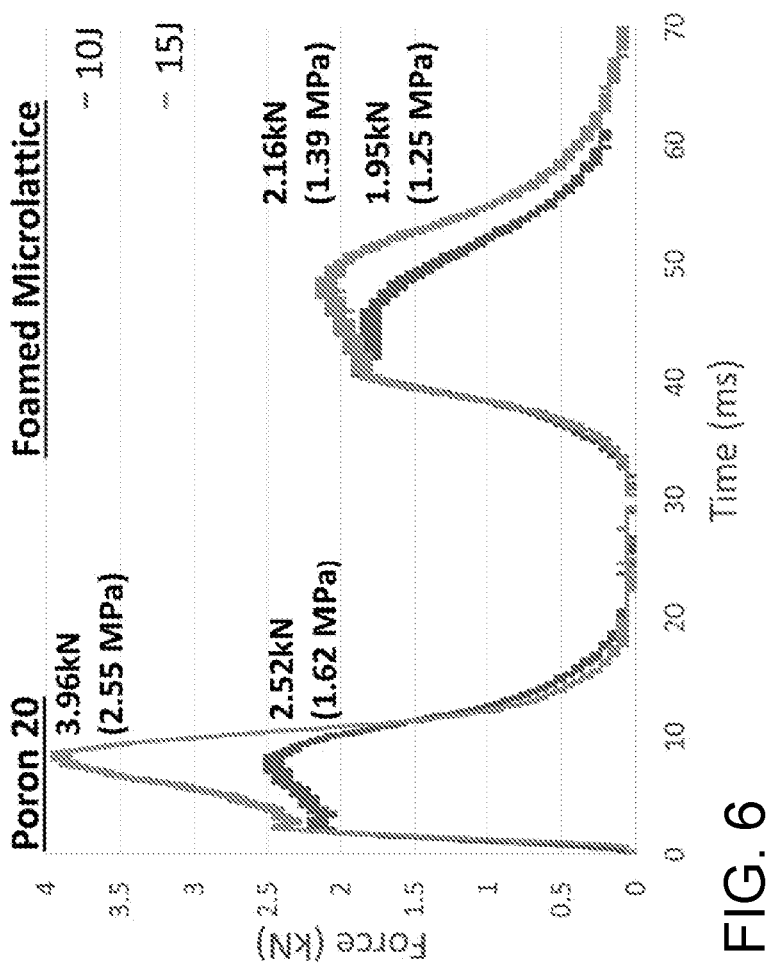
FIG. 6 is a graph comparing the impact absorbance of 10 Joule (J) and 15 J impacts from a 5.5 kg weight indenter on a PORON™ 20 foam and a composite foam material in accordance with one or more embodiments of the invention.
Figure 7:
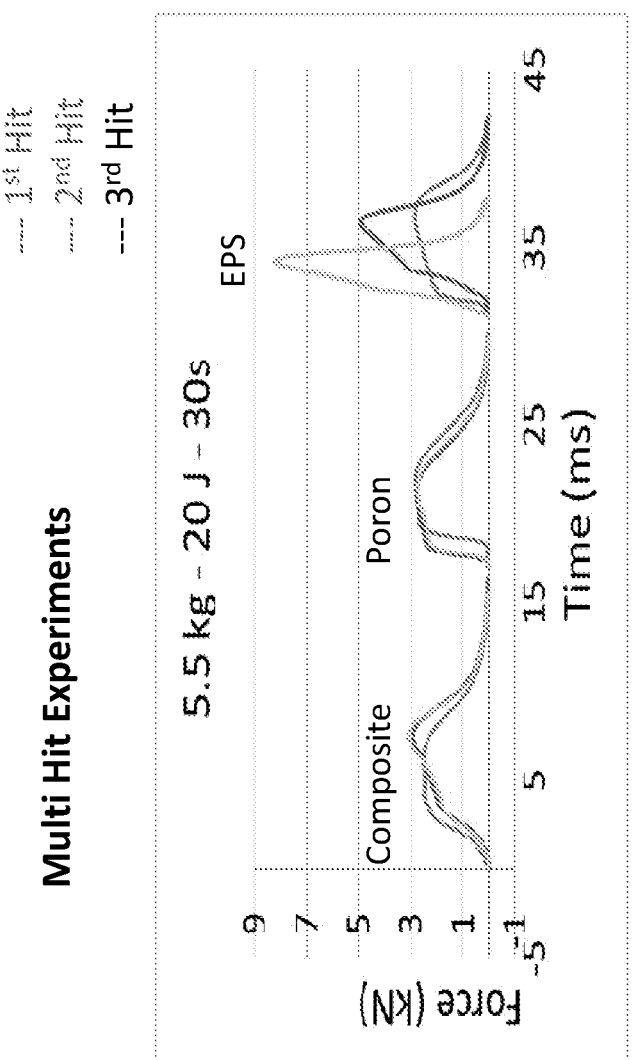
FIG. 7 displays impact data under multiple hit conditions and displays a graph comparing the impact absorbance from multiple 20 J, 30 second hits from a 5.5 kg weight indenter on a PORON™ 20 foam, expanded polystyrene (EPS) 72, and a composite foam material in accordance with one or more embodiments of the invention.

In one or more embodiments, the struts 206 comprise material, dimensions, geometry, and spacing, and/or the foam (open cell or closed cell) comprises material, pore size (e.g., pore width in a range of 1-1000 micrometers), pore spacing, and density (e.g., in a range between 50 kg/m$^3$ and 800 kg/m$^3$), and/or the foam and the lattice structure are combined such that:

the foam reinforces the struts in the lattice structure so as to provide additional support against (e.g., instantaneous) elastic buckling under dynamic compression; and the lattice structure elastically dissipates energy of an impact while force from the impact is still building up in the composite material; and/or an impact that generates an elastic response in the composite material generates a stress of no more than 5 MPa in the composite material (FIG. 6); and/or a peak force of no more than 2.16 kN and/or a stress of 0.1 MPa to 5 MPa is generated in the composite material in response to a 5.5 kg weight having an energy of 15 Joules impacting a 45 mm by 45 mm area on the composite material (FIG. 6); and/or the composite material absorbs more impact energy per unit area and thickness than a PORON™20 foam (FIG. 6); and/or the composite material is elastic; and/or the composite material is viscoelastic (FIG. 7); and/or the composite material has substantially similar impact performances under multiple impacts, for instance more than 2 or 3 repeated impacts (e.g., two or more repeated or equivalent impacts generate maximum forces in the composite material that have a variability of less than 0.7 kN from each other (FIG. 7).

Furthermore, in one or more embodiments, the foaming material and/or lattice structure comprise materials and dimensions, and are combined so that the composite material has substantially similar impact performances under a wide range of temperatures, for instance temperatures ranging from −17° C. to 50° C. In one instance, impacts on the composite material under temperatures ranging from −17° C. to 50° C. generate maximum forces in the composite material that have a variability of less than 3 kN from each other. Specifically, when the polymer preform lattice structure has a very low glass transition temperature, the stable response property (very similar impact performance under a wide range of cold and hot temperature conditions, e.g. −17° C. to 50° C.) of the polymer preform lattice structure is directly transferred to the composite foam material as a whole, Thus, unlike PORON™ foam that displays superior impact resistance properties only at room temperature, the composite foam material in illustrative embodiments described herein absorbs impact energy even at cold temperatures (see FIG. 8).

Thus, the present disclosure provides means for reinforcing the lattice structure with the foam (e.g., proper combination selection of materials, dimensions) so that various desirable impact properties are achieved.

Moreover, the above described manufacturing processes allow the creation of an integrated helmet or armor system. In one embodiment, an open preform of 2D or 3D woven carbon or glass fibers is used. The foam is then infused such that it penetrates all the way through the entire thickness of the fiber preform and then exits on the upper side to form a uniform layer of foam layer. That is, the fiber/foam composite has now a layer of pure foam on top of it to naturally create a bilayer structure of pure foam and composite foam. By placing the foam towards the body, head or structure, the composite material can be essentially used as an armor with the composite section essentially playing the role of a hard shell and thereby removing the need for placing the foam inside a separate shell.

The polyurea foam or the composite (e.g., comprising the polyurea foam) may head and body protection as well as protection in consumer products, such as, but not limited to, cell phones, mobile devices, etc.

The impact absorption of one exemplary composite foam material is further demonstrated in the example experiments discussed below.

Examples

Figure 5:
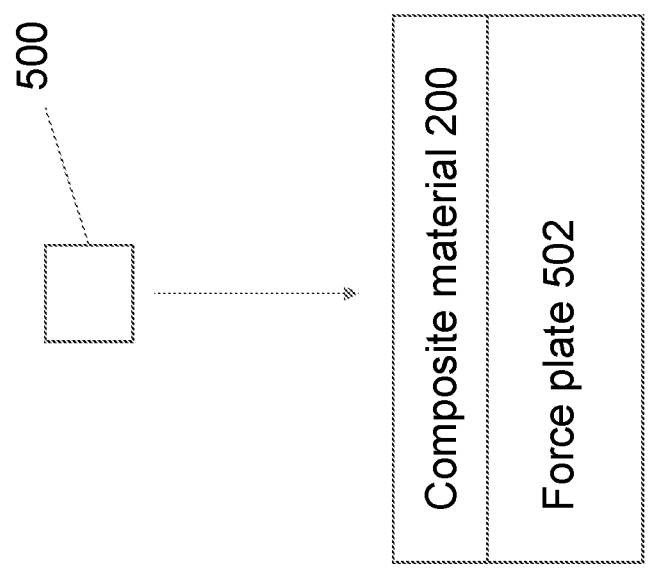
FIG. 5 illustrates a testing apparatus for testing the performance of the composite material according to one or more embodiments of the invention.
Figure 8:
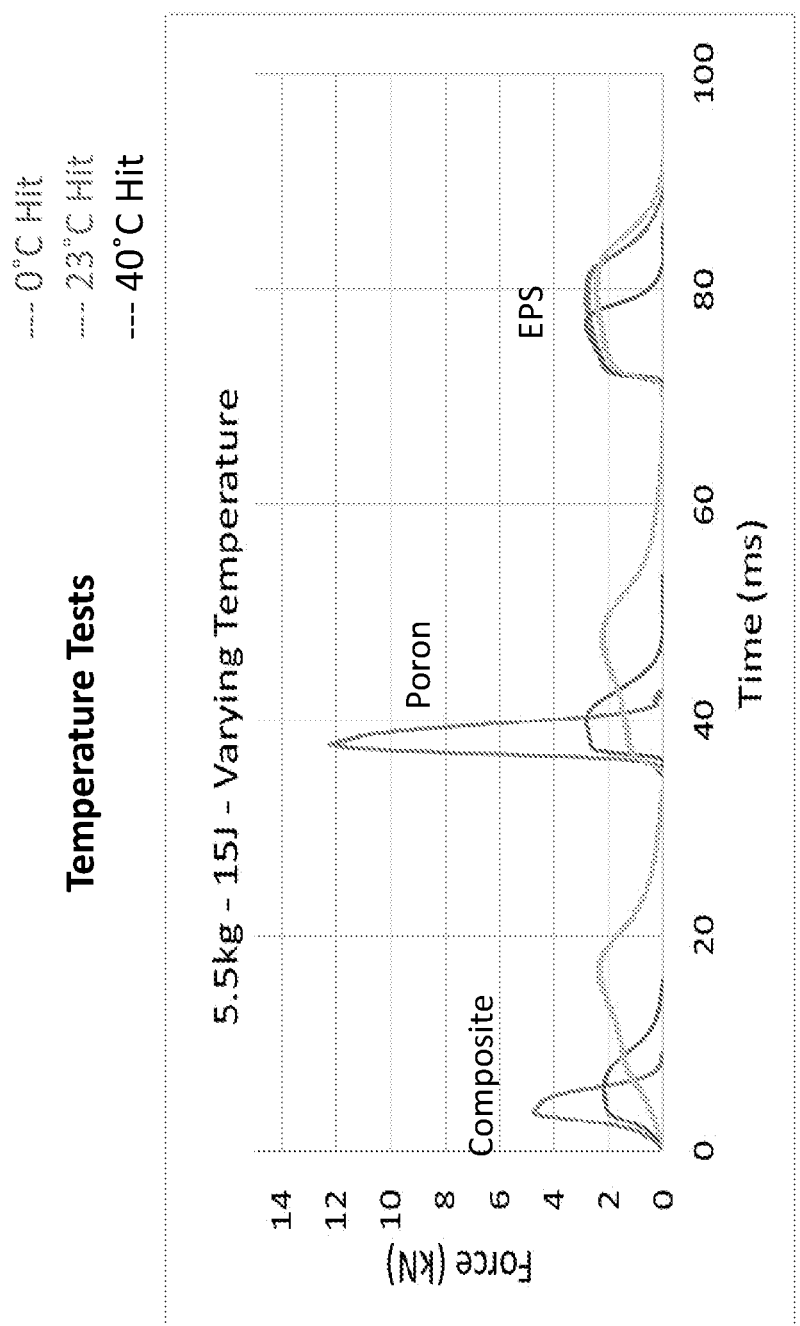
FIG. 8 is a graph comparing the impact absorbance at 0° C., 23° C., and 40° C. of 15 J for impacts from a 5.5 kg weight indenter on a PORON™ 20 foam, EPS 72, and a composite foam material in accordance with one or more embodiments of the invention.

FIGS. 6-8 illustrate the properties of the composite material fabricated according to the process illustrated FIGS. 2A-2C. In order to test the impact absorption properties of the foamed microlattices, the microlattices were cut into small square sections of dimensions 45 mm×45 mm and thickness 10 mm. Using the apparatus illustrated in FIG. 5, the composite material 200 sections were then tested using a 5.5 kg weight indenter 500 on a 45 mm force plate 502 at energies of 10 J and 15 J.

FIG. 6 shows the peak forces of the composite material 200 comprising a foamed microlattice were 1.95 kN and 2.16 kN for 10 J and 15 J energy level impacts, respectively, thereby showing better performance as compared to the PORON™20 foam that is very efficient only at ambient conditions (because of phase transformation due to its very high glass-transition temperature). FIG. 6 further illustrates that, even though the chosen energies were relatively low, the lower impact area yielded pressures up to 3 MPa.

FIGS. 7 and 8 show additional impact data under conditions that generate lower peak stresses (1.3 MPa). Note that at these lower pressures, PORON™ material gives comparable results.

TABLE 1

Tabulation of the measurements in FIG. 7.
Max Force Per Hit (kN)

| Foam | 1st hit | 2nd hit | 3rd hit |
|---|---|---|---|
| Composite | 2.496 | 2.904 | 3.12 |
| Poron 20 | 2.832 | 2.784 | 2.784 |
| EPS 72 | 2.856 | 4.98 | 8.28 |

FIG. 7 shows that the composite foam 200 is able to limit the impact force to the same level as EPS foam of the same thickness. EPS material absorbs energy through plastic crushing and therefore it cannot be re-used after first impact as the EPS cannot recover to its un-deformed state. Typically, such foams are able to absorb more impact energy compared to elastic and viscoelastic foams. Quite remarkably, however, our viscoelastic composite foam is able to absorb the same energy using the same section thickness and is also able to recover fully. Specifically, FIG. 7 illustrates the peak force for the composite foam 200 remains essentially unchanged after the same spot on the sample is impacted two additional times, whereas EPS stress increases dramatically after the first hit (indicating a loss of impact absorption in the EPS material). The multiple hit capability of the composite foam while absorbing impact energy at the same level as EPS material is truly a major advance.

FIG. 8 shows the impact test performed at different temperatures. At 0° C. the superior performance of the composite foam 200 can be clearly seen. For example, FIG. 8 illustrates the struts 206 comprise a polymer having a glass transition temperature such that impacts on the composite material under temperatures ranging from −17° C. to 50° C. generate maximum forces in composite material within 3 kN of each other.

TABLE 2

Tabulation of the measurements in FIG. 8
Max Force Per Hit (kN)

| Foam | 0° C. | 23° C. | 40° C. |
|---|---|---|---|
| Composite | 4.80 | 2.21 | 2.40 |
| Poron 20 | 12.24 | 2.83 | 2.28 |
| EPS 72 | 2.88 | 2.86 | 2.52 |

Figure 9C:
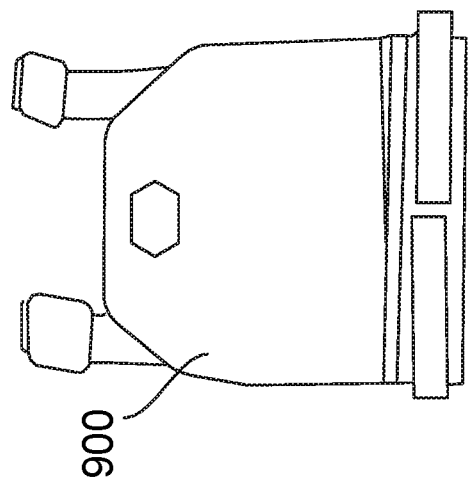
FIG. 9A-9C illustrate a helmet, shin guard, and vest comprising the composite material according to one or more embodiments of the invention.
Figure 9B:
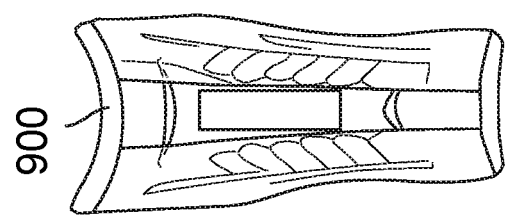
Figure 9A:
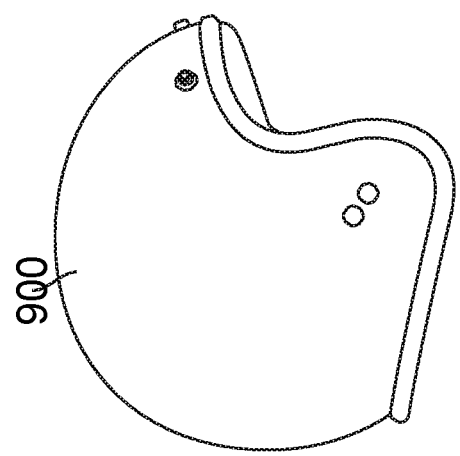

FIG. 9A illustrates a helmet comprising the composite material 900 as a protective impact absorbing layer. FIG. 9B illustrates a shin guard comprising the composite material as a protective impact absorbing layer. FIG. 9C illustrates a vest comprising the composite material as a protective impact absorbing layer. In each instance, the composite material 900 does not require an outer shell and the composite material 900 would be in direct contact with any impacting material.

Other examples of applications include, but are not limited to, the composite material used as the protective covering/layer or armor in a vehicle.

Advantages and Improvements

Currently, PORON™ foam from Rogers™ corporation is the best performing foam when tested under ambient conditions. The composite foam material disclosed herein, on the other hand, has been unexpectedly and surprisingly found to outperform PORON™ foam under similar conditions.

The unique impact properties of the composite foam material according to one or more embodiments are a result of multiple material and microstructural energy dissipation and momentum trapping mechanisms. The combination of elastic buckling at the macro (e.g., micro lattice struts) and the micro (foam pores) length scales that occur within the composite foam material give rise to superior impact attenuation properties when compared to current commercial foams. The macro length scale provided by the lattice is able to elastically bend at much lower stress levels and therefore starts to dissipate the energy of the incoming impact very early in its time history as the force is still building up on the structure. It is essentially like "breaking the fall" of a falling object before it hits the ground. Next, the foam is able to reinforce the lattice struts allowing for a gradual deformation of the composite foam system. The gradual deformation of both lattice and foam matrix allows for an extended force-plateau region under dynamic compression, increasing the impact absorption abilities by increasing the impact duration while simultaneously prolonging the densification of the foam. These mechanisms operate simultaneously and sequentially at varying length scales (microns to centimeters in dimension). Furthermore, they operate synergistically thereby significantly reducing the transmitted impact forces across the foam section.

Embodiments of the present invention recognize the synergistic co-dependency of deformation between beams and columns of the much larger length scale lattice structure and the much smaller length scale microstructural struts of the foam matrix to efficiently manage incoming impact energy. As described above, the combination of buckling at the macro (microlattice struts) and the micro (foam pores) levels enhances the impact absorption properties of the composite foam material. Thus, by changing the stiffness of the lattice (by changing the dimensions, spacing, and material of the struts), the impact properties of the composite foam material can be tuned such that the composite material can absorb impact energy by limiting the peak stress in a very wide range (0.1 MPa to 5 MPa). This is demonstrated in the impact test results shown in FIGS. 6-8.

The tunable impact properties of the composite foam material dramatically open up the application space for the composite foam material. Absorbing impact energy while keeping the peak stress in the 0.1 MPa to 2 MPa range is best for commercial applications involving head/helmet and body impacts in sports (ski, skateboard, baseball, football, lacrosse, for example) and accidents, while higher stress levels are best for mitigation of high energy impacts or blast shock waves in the battlefield. The composite material according to embodiments of the present invention can be used as a standalone armor material or in combination with other materials and structural systems.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An elastic or viscoelastic composite material useable as an impact absorbing device, comprising:
   a lattice structure embedded in a foam, wherein:
   the lattice structure comprising interconnected struts each having a length and a width;
   the foam comprising semi-closed cells, the semi-closed cells each comprising a substantially continuous cell wall defining a cell size, the cell size being smaller than the length of the strut, wherein the continuity of the is cell wall is interrupted by least one perforation or aperture each having a diameter, the diameter of the at least one perforation or aperture being smaller than the cell size;
   wherein upon an impact, the foam reinforces the lattice structure.

2. The elastic or viscoelastic composite material of claim 1, wherein:
   the lattice struts comprise a first viscoelastic material, and the foam comprises a second viscoelastic material,
   such that an impact that generates an elastic response in the composite material generates a stress of no more than 5 MPa in the composite material.

3. The elastic or viscoelastic composite material of claim 1, wherein the perforations or apertures of the foam have dimensions that reinforce the lattice structure struts against elastic buckling under dynamic compression, such that the lattice structure elastically dissipates energy of the impact while force from the impact is still building up in the composite material.

4. The elastic or viscoelastic composite material of claim 1, wherein the lattice struts comprise a first viscoelastic material, and the foam comprises a second viscoelastic material such that a peak force of no more than 2.16 kN is generated in the composite material in response to a 5.5 kg weight having an energy of 15 Joules impacting a 45 mm by 45 mm area on the composite material.

5. The elastic or viscoelastic composite material of claim 1, wherein the lattice struts comprise a first viscoelastic material, and spacing, and the foam comprises a second viscoelastic material such that a stress of 0.1 MPa to 5 MPa is generated in the composite material in response to a 5.5 kg weight having an energy of 15 Joules impacting a 45 mm by 45 mm area on the composite material.

6. The elastic or viscoelastic composite material of claim 1, wherein the composite material is viscoelastic so that two or more equivalent and repeated impacts on the composite material generate maximum forces in the composite material that have a variability of less than 0.7 kN from each other.

7. The elastic or viscoelastic composite material of claim 1, the struts comprise a polymer having a glass transition temperature and the foam is viscoelastic such that impacts on the composite material under temperatures ranging from −17° C. to 50° C. generate maximum forces in the composite material within 3 kN of each other.

8. The elastic or viscoelastic composite material of claim 1, wherein the lattice structure is a polymer lattice structure.

9. The elastic or viscoelastic composite material of claim 8, wherein the lattice structure comprises polyurea.

10. The elastic or viscoelastic composite material of claim 1, wherein the foam comprises a blend between a polymeric di-isocyanate and a polyol or amine.

11. The elastic or viscoelastic composite material of claim 1, wherein the foam comprises a polyurea foam comprising an oligomeric diamine polyol combined with diisocyanate.

12. The elastic or viscoelastic composite material of claim 11, comprising a ratio of diamine polyol to diisocyanate ranging from 1:1 to 10:1.

13. The elastic or viscoelastic composite material of claim 12, wherein the ratio is 4:1.

14. The elastic or viscoelastic composite material of claim 1,
   wherein the foam has a density in the range of 30 kg/m$^3$ and 500 kg/m$^3$,
   wherein the length is in a range from 1 micrometer to 100 centimeters and the width is in a range of 1 micrometer to 100 centimeters, and
   wherein the cell size is in a range of 1 to 1000 micrometers.

15. The elastic or viscoelastic composite material of claim 11, wherein the cell size is in a range from 1 micron to 1000 microns and the diameter of the at least one perforation or aperture is in a range from 1 micron to 1000 microns and the foam has a density in the range of 30 kg/m$^3$ and 200 kg/m$^3$.

16. The elastic or viscoelastic composite material of claim 11, wherein the foam comprises a viscoelastic material having a temperature stability characterized by a glass transition temperature controllable in a range from Tg (−50° C.) up to at least room temperature.

17. The elastic or viscoelastic composite material of claim 1, wherein the foam has a density in a range between 50 kg/m$^3$ and 800 kg/m$^3$.

18. The elastic or viscoelastic composite material of claim 14, wherein the diameter of the at least one perforation or aperture is independently controlled from the cell size and is in a range of 1-1000 microns.

19. The elastic or viscoelastic composite material of claim 1, wherein the foam comprises a viscoelastic material having a density in a range of 30 kg/m$^3$ and 200 kg/m$^3$.

20. The elastic or viscoelastic composite material of claim 1, wherein the composite material is viscoelastic below 5 degrees Celsius and above 45 degrees Celsius.

21. The elastic or viscoelastic composite material of claim 1, wherein the composite material comprises a bilayer comprising a layer of foam infused into the lattice structure and a layer of foam not having the lattice structure.

22. A helmet, shin guard, vest, or armor comprising the elastic or viscoelastic composite material of claim 1, wherein the composite material is exposed and would be in direct contact with an impact.

23. A method of making an elastic or viscoelastic composite material useable as an impact absorbing device, comprising:
   forming a composite material comprising a lattice structure embedded in a foam, wherein:
   the lattice structure comprising interconnected struts each having a length and a width;
   the foam comprising semi-closed cells, the semi-closed cells each comprising a substantially continuous cell wall defining a cell size, the cell size being smaller than the length of the strut, wherein the continuity of the is cell wall is interrupted by least one perforation or aperture each having a diameter, the diameter of the at least one perforation or aperture being smaller than the cell size;
   wherein upon an impact, the foam reinforces the lattice structure.

24. The method of claim 23, further comprising:
preparing the lattice structure using a polymer; and
foaming a mixture through the lattice structure so as to form the foam such that the lattice structure embedded in the foam.

25. The method of claim 24, wherein the mixture comprises a blend between a polymeric di-isocyanate and a polyol or an amine.

26. The method of claim 24, wherein the lattice structure is placed in the mixture prior to the foaming.

27. The method of claim 24, further comprising:
positioning the lattice structure in a mold; and
pouring the mixture into the mold, wherein the foaming results in the mixture rising up in the mold and infusing with the lattice structure.

28. The method of claim 24, further comprising:
continuously feeding the lattice structure through a top roller;
continuously feeding the mixture on a surface carried by a bottom roller, the mixture positioned below the lattice structure; and
foaming the mixture, wherein the foam rises up and infuses with the lattice structure, thereby creating a sheet of the composite material.

29. The method of claim 23, wherein the foaming is carried out at one or more temperatures ranging from 50° C. to 400° C.

30. The method of claim 23, further comprising curing the composite material at a temperature ranging from 70° C. to 300° C.

31. The method of claim 23, further comprising applying a negative pressure to the mixture during foaming.

* * * * *